(12) United States Patent
Rinard et al.

(10) Patent No.: US 12,367,038 B2
(45) Date of Patent: Jul. 22, 2025

(54) SYSTEM AND METHOD FOR ANALYZING AND STEERING USE OF THIRD-PARTY LIBRARIES

(71) Applicant: Massachusetts Institute of Technology, Cambridge, MA (US)

(72) Inventors: Martin C. Rinard, Arlington, MA (US); Nikolaos Vasilakis, Somerville, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 227 days.

(21) Appl. No.: 18/056,072

(22) Filed: Nov. 16, 2022

(65) Prior Publication Data
US 2023/0153109 A1    May 18, 2023

Related U.S. Application Data

(60) Provisional application No. 63/279,969, filed on Nov. 16, 2021.

(51) Int. Cl.
*G06F 8/75*    (2018.01)

(52) U.S. Cl.
CPC .................... *G06F 8/75* (2013.01)

(58) Field of Classification Search
None
See application file for complete search history.

(56) References Cited

U.S. PATENT DOCUMENTS

| | | | | |
|---|---|---|---|---|
| 9,892,272 | B2 * | 2/2018 | Goodes | G06F 21/54 |
| 2009/0249307 | A1 * | 10/2009 | Yoshida | G06F 8/75 |
| | | | | 717/131 |
| 2013/0014274 | A1 * | 1/2013 | Goodes | G06F 21/54 |
| | | | | 726/26 |
| 2016/0196244 | A1 * | 7/2016 | Greenberg | G06F 40/106 |
| | | | | 715/205 |
| 2017/0116396 | A1 * | 4/2017 | Gu | G06F 8/41 |
| 2018/0032746 | A1 * | 2/2018 | Goodes | G06F 21/6209 |
| 2020/0220916 | A1 * | 7/2020 | Ahmed | G06T 1/20 |

* cited by examiner

*Primary Examiner* — Ryan D. Coyer
(74) *Attorney, Agent, or Firm* — Nieves IP Law Group, LLC; Peter A. Nieves

(57) ABSTRACT

A system for analysis and steering use of online libraries, contains program source code comprising a plurality of modules, at least one third party library, and a processor and a memory configured to store non-transitory instructions that, when executed by the processor, run a module recontextualization application. The module recontextualization application is configured to decompose a program within the third-party library at boundaries of modules of the program, apply transformations to the decomposed program to insert analysis specific code, and reassemble individual components of the decomposed program to maintain original semantics of the program, while incorporating the transformations that were applied to the decomposed program.

15 Claims, 19 Drawing Sheets wrap (e: Value, α: Analysis) : Value := match e with
  | (s, v) :: vs]  → [(s, wrap v) :: wrap vs]
  | [v :: vs]      → [(wrap v) :: wrap vs]
  | λ(...args).f   → λ(...args).{ α$_1$( f( α$_2$(args) ) ) }
  | \_             → interpose(α$_3$, e)
end

FIG. 12

SYSTEM AND METHOD FOR ANALYZING AND STEERING USE OF THIRD-PARTY LIBRARIES

CROSS-REFERENCE TO RELATED APPLICATIONS

The present application claims priority to U.S. provisional patent application No. 63/279,969, entitled "System and Method for Analyzing and Steering Use of Third-Party Libraries", filed on Nov. 16, 2021, which is incorporated herein by reference in its entirety.

FIELD OF THE INVENTION

The present invention is related to the preparation and use of online libraries, and particularly, to more efficient use of the online libraries for the analysis and steering of the execution of programs of the library.

BACKGROUND OF THE INVENTION

Online libraries are commonly used by software applications. While software applications were once packaged and sold as a product, technology advanced to allow for applications to be downloaded from an online location. This allowed for updating of software so that the latest software version was downloaded at the time of installation, and new updates could be provided to downloaded software. As technology has continued to advance, portions of software applications are maintained in online libraries, for use while a software application stored on a local computer is actively running.

To maintain an efficiently working software environment while using executable portions of software stored within online libraries, it is important that any modules or functionality of a software application that is executed in an online library be executed in a seamless manner with little to no delay so as to have no detrimental effect on software execution or user experience.

Dynamic program analysis is a long-standing technique for obtaining information about program execution. Dynamic program analysis is also a technique for monitoring, understanding, and potentially intervening in program behavior during execution of the program itself. To cite only a few non-limiting examples, dynamic analysis has been used to infer invariants, check security constraints, and extract performance characteristics of programs.

Existing dynamic analyses often impose significant runtime overhead. For example, Jalangi, which is a dynamic analysis framework for both front-end and back-end JavaScript®, and RoadRunner, may report no-op analysis overheads on the order of 26×-32× and 52×, respectively. For this reason, dynamic analysis is typically deployed for offline use—collecting and replaying traces offline or stressing a program with test inputs in a test environment. The fact that production environments can differ considerably from offline or testing environments can significantly impair the utility of dynamic analyses that are deployed only during development or testing. Software vulnerabilities, for example, can be latent during development and test, but exploitable only in production. Therefore, there is a desire to not only provide efficient and seamless use of online libraries for software execution, but also to use highly effective dynamic program analysis during the execution of programs without significant runtime overhead.

SUMMARY OF THE INVENTION

Embodiments of the present invention provide a system and method for analyzing and steering use of third-party libraries. Briefly described, the method includes providing module recontextualization, which is enabled by featuring a module-import mechanism that loads code at runtime as a string. This approach uses lightweight load time code transformations that operate on the string representation of the module, as well as the context to which it is about to be bound, to insert developer-provided, analysis-specific code into the module before it is loaded, where the module is derived from a third-party library. This code implements the dynamic analysis, enabling this approach to capture all interactions around the module in unmodified production language runtime environments, thereby allowing for analysis and steering use of third-party libraries.

Referring to one embodiment of the system for analysis and steering use of online libraries, the system contains program source code comprising a plurality of modules, at least one third-party library, and a processor and a memory configured to store non-transitory instructions that, when executed by the processor, run a module recontextualization application. The module recontextualization application is configured to: decompose a program within the third-party library at boundaries of modules of the program; apply transformations to the decomposed program to insert analysis specific code; and reassemble individual components of the decomposed program to maintain original semantics of the program, while incorporating the transformations that were applied to the decomposed program.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principals of the invention.

FIG. 12 demonstrates an exemplary algorithm illustrating positioning of analysis hooks.

DETAILED DESCRIPTION

Figure 1:
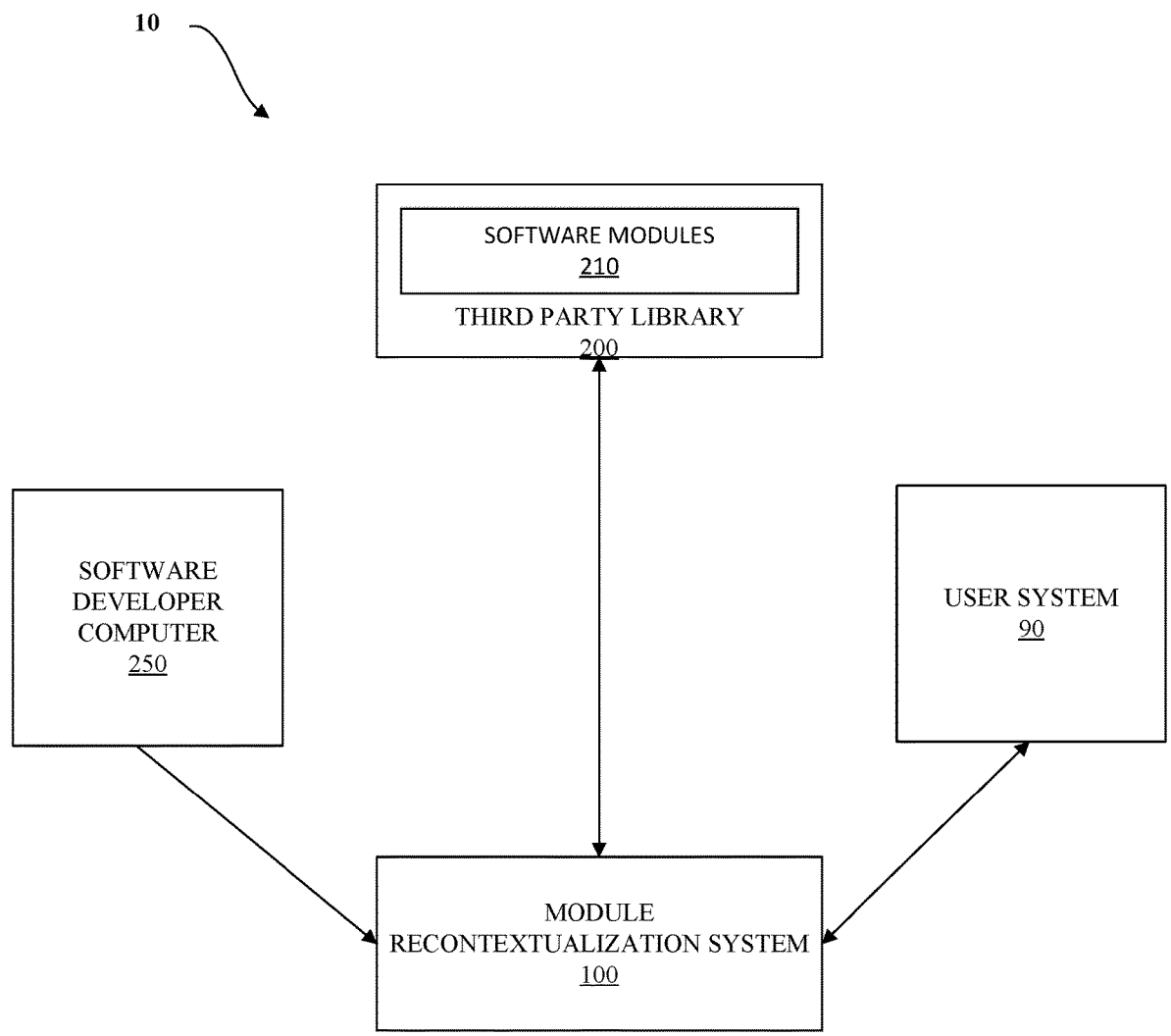
FIG. 1 is a schematic illustration of a network in which the present system and method may be provided.

The present system and method addresses the desire to not only provide efficient and seamless use of online libraries for software execution, but also to use highly effective dynamic program analysis during the execution of the software without the significant runtime overhead that is typical of dynamic program analysis. As used within this disclosure, a "library" refers to a collection of files, programs, routines, scripts, or functions that can be referenced in programming code by a computer application.

Module recontextualization is provided by the present system and method, which is a novel dynamic analysis approach that targets modern dynamic languages such as, but not limited to, JavaScript® and Racket®, enabled by the fact that they feature a module-import mechanism that loads code at runtime as a string.

The following simple example is provided to demonstrate at a top level the concept of recontextualization. Imagine a car with an application programming interface (API) having two functions, namely, accelerator, and break. One can build fragments of the car inside the seat of the driver of the car and hook inner accelerator and inner break functions to replications of these functions outside of the car, inserting an interposition device in between the inside of the car and the outside of the car replication. One can then interpose when the driver of the car accelerates or breaks, thereby recording how they drive or even intervening. This basic concept is referred to as recontextualization and is described in further detail herein.

Module recontextualization uses lightweight load time code transformations that operate on the string representation of the module, as well as the context to which it is about to be bound, to insert developer-provided, analysis-specific code into the module before the module is loaded, where the module is derived from a third-party library. This developer-provided, analysis-specific code implements the dynamic program analysis when run, enabling the capture of all interactions around the module in unmodified production language runtime environments, thereby allowing for analysis and steering use of third-party libraries in accordance with the present invention.

For exemplary purposes only, the present description provides for method implementation in systems targeting the JavaScript® and Racket® ecosystems. This approach delivers order-of-magnitude performance improvements over state-of-the-art dynamic analysis systems, while supporting a range of analyses, implemented, for example, on average in about one hundred lines of code, although the present invention is not limited to supporting a range of analyses implemented on such average. It is to be noted that, as previously stated, while the following description exemplifies usage within JavaScript® and Racket® ecosystems, the present system and method may be provided on other modern dynamic languages that feature a module-import mechanism that loads code at runtime as a string.

FIG. 1 is a schematic diagram illustrating a general network 10 in which the present system and method for analysis and steering use of third-party libraries may be provided. As shown by FIG. 1, the network 10 contains a user system 90, which allows a user to engage within the present network 10. The user system 90 may be, for example, but not limited to, a desktop computer, a laptop computer, a mobile communication device such as a cellular telephone, or another system that can store software therein that requires a module of the software from a third-party library.

The network also contains a module recontextualization system 100 which uses lightweight load-time code transformations. The module recontextualization system 100, as well as the use of lightweight load-time code transformations, is described in further detail herein. As will be described in further detail herein, the recontextualization system 100 may be a server-based system, a desktop computer, a laptop, or any other system having a memory and processor that is capable of requesting a module of software from a third-party library.

A third-party library 200 is located within the network 10, to which the module recontextualization system 100 is connected in a wired or wireless manner. For example, the module recontextualization system 100 may connect to the third-party library 200 via the internet, a local area network, a direct wired connection such as a cable, or any other means of communication. The third-party library 200 has software modules 210 stored therein, which may be requested by the module recontextualization system 100, as is further described in detail herein.

A software developer computer 250 communicates with the module recontextualization system 100 to, among other things, provide the module recontextualization system 100 with analysis specific code to apply to modules within the third-party library 200. This process is described in detail herein. It should be noted, that in accordance with an alternative embodiment of the invention, functionality associated with the software developer computer 250 may instead by provided within the module recontextualization system 100, thereby allowing the software developer to simply access the network 10 via the module recontextualization system 100 itself, and not through another computer. In such an embodiment, functionality that is described herein with regard to the software developer computer 250, would instead be provided by the module recontextualization system 100. Functionality of the module recontextualization system 100, third-party library 200, and software developer computer 250 is described in detail herein.

Module recontextualization, as provided by the present system and method, is an approach that operates at the granularity of modules, with the resulting developer-provided, analysis-specific code executing at module boundaries. The goal is not to supplant existing techniques that operate at the granularity of instructions or procedures. The goal is instead to provide a coarse analysis with low enough overhead, for example, in the order of, but not limited to, 2-3% runtime overhead, to enable always-on, uniform deployment during development, testing, and production, which is provided by the present system and method.

Module recontextualization leverages characteristics of modern dynamic languages to dynamically transform each module of software from the third-party library 200 when it is loaded by a user, applying both source code and object transformations. It is noted that while the present description describes each user module being transformed, in accordance with an alternative embodiment of the invention, select modules of software are transformed and not all of them. This method of the present invention, therefore, requires no changes to the runtime environment and works with completely unmodified dynamic language production runtimes. Although not required, it is preferred that the analyses themselves are written in the same language as the analyzed program, preserving developer knowledge, expertise, libraries, and code, and enabling the development of analyses that analyze analysis code. These analyses remain fully under developer control, with module recontextualization supporting targeted analysis of only selected software modules of the library as the application requiring the software modules of the library executes.

The following first presents background on module systems employed by dynamic languages. Exemplary use cases are described that highlight the kinds of analyses the present system and method is designed to support. In addition, the following describes characteristics of the environments and analyses that the present system and method targets.

As is known by those having ordinary skill in the art, modules encapsulate reusable functionality. This functionality typically falls into one of two categories: it either (i) comes bundled with the language, possibly wrapping operating-system interfaces such as the file system in a way that is system-agnostic and conforms to conventions of the language, or (ii) is provided by other developers sharing code others might find useful. Consider, for example, a module named "simple-math", as illustrated next, providing a few mathematical functions such as mul and div:

```
let math = {
    mul: (a, b) => a * b,
    div: (a, b) => {
        import("log").info(b);
        return a / b } };
    // ...some more code...
    exports = math;
```

This module named "simple-math" may be imported and used by a different module, as shown next:
let m=import("simple-math");
let result=m·div(m·mul(1, 2), m·mul(3, 4));
print(result); exports=result;

From the perspective of a software developer, importing a module makes its functionality available to the calling code by means of binding its functionality to a name in the scope of the caller. This is achieved by a form of exporting, where the module developer expresses which values should become available to the importing code. The definition of a value depends on the semantics of the language. Internally, the module may import other modules, cause side effects to the file system or the network, or even be implemented in multiple languages.

Importing a module in a dynamic language such as JavaScript® typically involves several steps. The runtime system first locates the module in the file system. It then reads the module and wraps it to resolve module-local names, such as filename in JavaScript and name in Python®, to meaningful values. The wrapper is then interpreted and evaluated using the interpreter of the language, which might result in side effects—for example, a process.exit( ) in the module's top-level scope will exit the entire program. Finally, the value bound to the exported interface or returned from this interpretation (depending on the language) is made available to the scope of the importing code.

Complications may include the use of a module cache to avoid loading overheads and maintain consistency for modules that are loaded multiple times from different parts of the code base. The use of a module cache can also support recursive imports and cyclic dependences. An increasingly common feature is to allow different versions of the same module to co-exist in a program, to avoid imposing one mutually exclusive choice—a paradoxical situation known as "dependency hell". As a result, a single import/may not necessarily resolve to the same (version of the) module/ every time. The dual of this is also possible: two different module names may resolve to the same identifier, or in other words, point to the same cache entry. These features can significantly complicate dynamic analyses that operate at the granularity of modules. These issues are further discussed herein, as well as how the present system and method addresses them.

Dynamic Program Analysis Examples

For exemplary purposes, the following describes three example dynamic program analyses that can be performed at the granularity of modules: (i) a read-write-execute security analysis, (ii) a performance-profiling analysis, and (iii) an analysis extracting runtime type invariants.

Security Analysis: The pervasive reliance on third-party libraries has led to an explosion of supply-chain attacks. Both bugs and malicious code in libraries create attack vectors, exploitable long after libraries reach their end users. Popular libraries, depended upon by tens of thousands of other libraries or applications, can allow vulnerabilities deep in the dependency graph to affect a great number of applications.

Consider, for example, the recent event-stream incident, in which a maintainer of a highly popular library inserted code to steal Bitcoin wallet credentials from programs using that library. Heavyweight testing or instrumentation would not have helped, as event-stream activated only during production rather than during testing or development. Whole-program OS-level containment or system-call interposition, would not have helped either as the programs importing event-stream already made use of system calls to access the disk and network. Finally, static analysis would have been of little use, as event-stream encrypted its malicious payload.

A module-level dynamic analysis of read/write/execute permissions used by this library would have detected the unusual resources accessed by event-stream. Analyzing the behavior within the library itself is not critical: if any data exfiltration is happening, it will require calling out of the library and into the network—in event-stream's case, using the fs library to modify a different library and then call http from the second library. Both fs and http are part of the standard library, built into the runtime environment. Other examples of interfaces that are available to the entire program include global variables, library importing, and the module cache—all of which are accessible by any third-party library.

Performance Diagnosis: Diagnosing performance problems is a difficult task, exacerbated by the heavy use of third-party libraries. These libraries often work well until there is an unexpected change in the type or characteristics of the workload. In many cases, the performance behavior of these libraries is affected by a single unusual input.

Consider, for example, the minimatch library, a regular-expression-based file-matching utility susceptible to long delays due to regular expressions that involve backtracking. Pathological inputs reaching minimatch, even if benign, can cause significant performance degradation deep in the dependency chain, affecting also other parts of the program competing for the same resources. Developers use various techniques to understand such problems, and example being the collecting and replaying of traces against offline versions of the system, or using statistical profiling to identify hot code-paths. These techniques, however, require significant manual effort: capturing traces, setting up test beds, replaying traces, analyzing statistics, and debugging performance are all tedious and time-consuming tasks, compounded by the difficulties of mapping the results to the right third-party libraries.

A library-level profiling analysis would quickly detect any slowdown and appropriately attribute it to the bottlenecked mini-match. Wrapping library interfaces with profiling logic can be of aid to constructing a model of the current workload. Such profiling could operate at a high resolution in time and space—at every function call entering a library and on hundreds of libraries across an application—but does not need to track detailed operations such as direct variable accesses. Each library wrapper can collect profiling statistics at its own boundary, aggregating summaries into a global structure ordering libraries by resource consumption. Type Invariant Discovery: Extracting type information at the module boundary is helpful in a variety of scenarios. For example, it can be used to identify program invariants to be preserved during code modifications, or guide program learning and regeneration. Dynamically extracted type information is particularly relevant for dynamically typed languages that have no explicit type information in the language.

Consider, for example, the gRPC module for serializing and deserializing objects. To use this module, developers provide a protocol-buffer specification describing the types of values that will be serialized. Given a library—e.g., bignum, crypto—a developer has to first call it manually, take note of the result's type, and then fill in the protobuf spec. This process must be repeated with every change, often due to library updates or changes in the consuming program's structure.

Module-level dynamic analysis, as is provided by the present system and method, could be used to discover such type assertions or invariants. The analysis would consult the definition of a type system, capturing the type of values at the boundaries of libraries by observing their arguments during the execution of the program.

The present system and method exploits features of modern dynamic language environments, for example dynamic module loading, runtime metaprogramming facilities such as reflection or exposing object accesses as overloadable functions, and runtime resolution of external references. The basic approach is therefore not appropriate for software written in traditional compiled languages such as C, Java, ML, or Haskell. It is also not appropriate for traditional scripting languages such as the Unix shell.

Because the present system and method operates at the granularity of modules, it targets modern application development methodologies where applications comprise hundreds of modules, with the modules typically reused from large open-source repositories such as, for example, but not limited to, GitHub® or Npm®. These methodologies deliver applications with (i) a module decomposition coarse enough for minimal runtime overhead, (ii) a module decomposition fine enough to support meaningful analyses that operate at the module granularity (the present system and method is therefore not well suited for monolithic applications with few or no modules), and (iii) most of the code obtained from external and potentially untrusted sources (motivating the need for dynamic analyses that can pinpoint and help solve security or performance issues).

The techniques of the present system and method, as described herein, work well when the recency of information (ideally, online) is more important than the level of detail. The techniques meet such recency needs through a combination of factors. First, the present system and method provides the ability to perform the analysis online by operating at a coarser granularity, by using a production-optimized runtime, and by toggling parts of the analysis on and off. Second, it allows developers to leverage their expertise in their language of choice— rather than introducing a new language only for analysis: the program being analyzed and the program implementing the analysis can only be in the same language, as the analysis transformations are applied dynamically over the program by the same runtime environment. Third, it deconstructs programs only at library boundaries, a natural boundary for many problems caused (or exacerbated) by third-party libraries.

The present system and method, as well as functionality of the same, is described immediately hereafter. To understand this description, it is necessary to understand a definition of certain terms, as described herein. To assist with understanding this description, the description is provided with reference to certain flowcharts as referenced herein.

Figure 2:
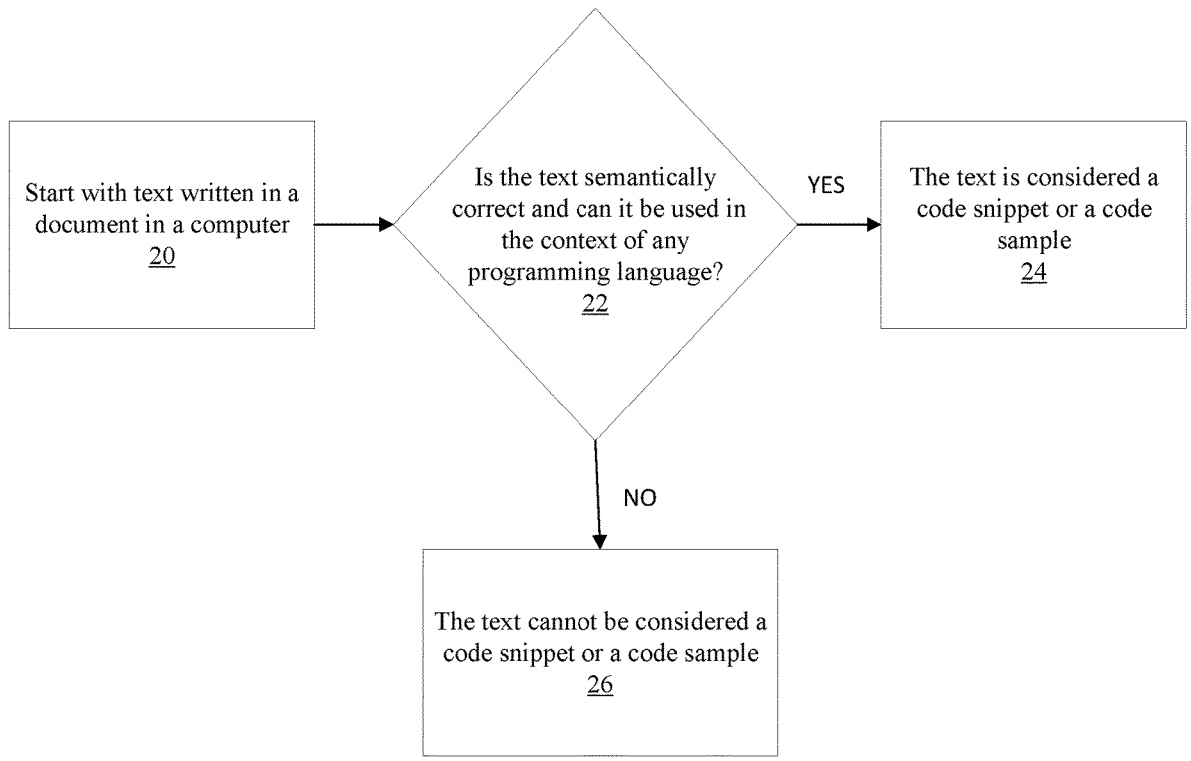
FIG. 2 is a flowchart illustrating steps that can be taken to determine if text can be considered a snippet or code sample.

Code Snippet/Sample:

Referring to the flowchart of FIG. 2, beginning with text written in a document in a computer (block 20), a determination is made as to whether the text is semantically correct and whether it can be used in the context of any programming language (block 22). If the text is semantically correct and can be used in the context of any programming language, the text is considered a code snippet or a code sample (block 24). If the text is not semantically correct and/or cannot be used in the context of any programming language, the text cannot be considered a code snippet or a code sample (block 26). In short, a code snippet is a code fragment or a piece of code.

Figure 3:
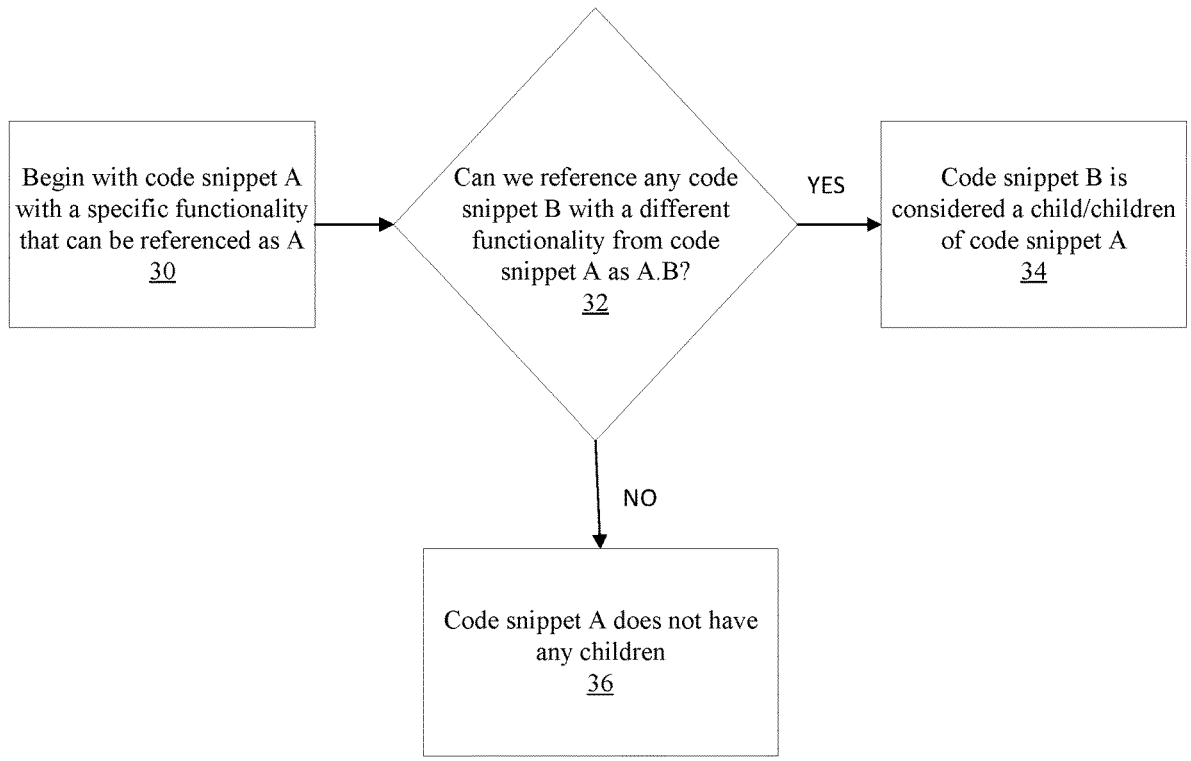
FIG. 3 is a flowchart illustrating steps that can be taken to determine if a code snippet can be considered a code child.

Code Children:

Referring to the flowchart of FIG. 3, beginning with code snippet A with a specific functionality that can be referenced as A (block 30), a determination is made by runtime environment implementing the programming language as to whether any code snippet B can be referenced with a different functionality from code snippet A as A.B (block 32). There is either a pointer from A to B, or there is no pointer. A and B can be identical, such as in the case of a cyclical reference, which is a thing pointing to itself. If any code snippet B can be referenced with a different functionality from code snippet A as A.B, then code snippet B is considered a child of code snippet A (block 34). Alternatively, if we cannot reference any code snippet B with a different functionality from code snippet A as A.B, then code snippet A does not have any children (block 36). In short, the start of a pointer from A to B is a parent, and the end is a child.

Figure 4:
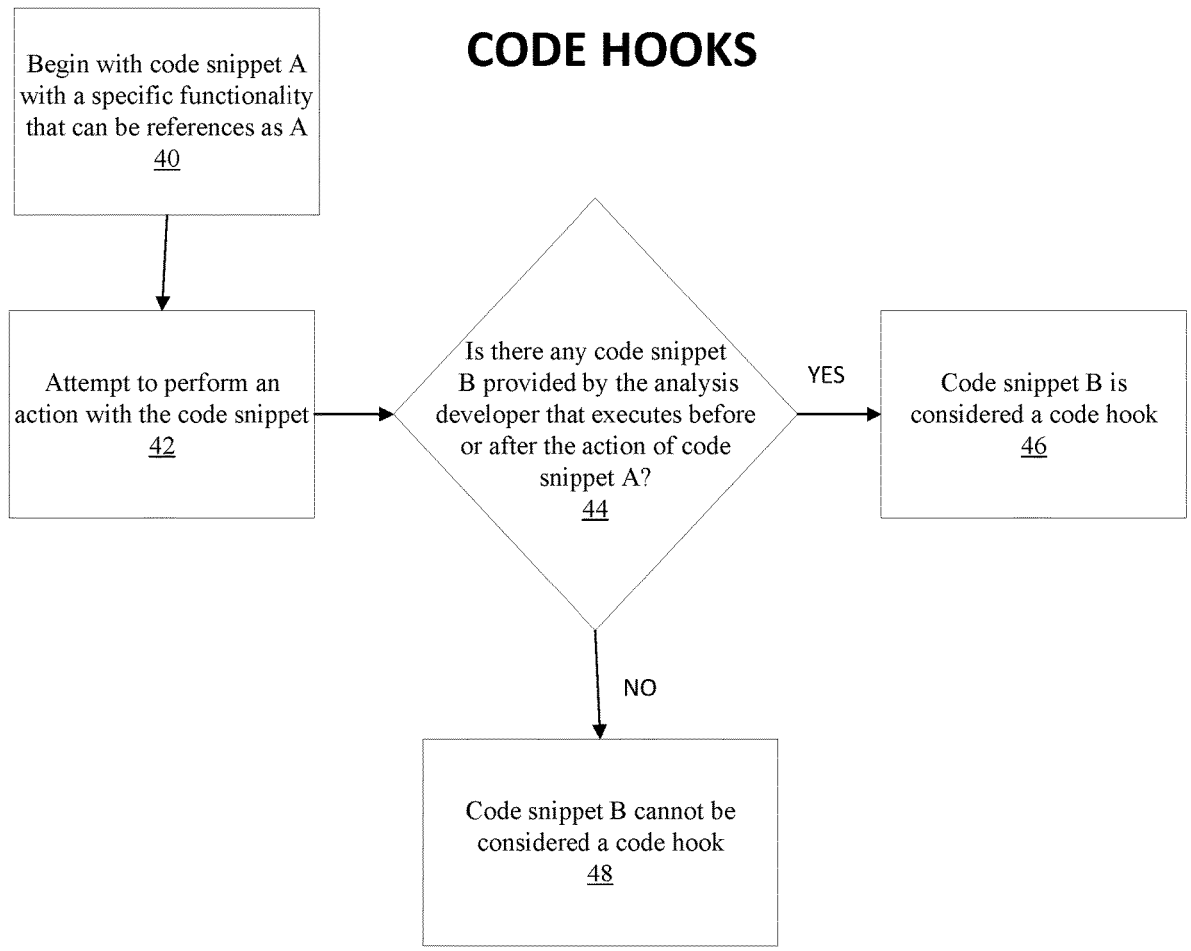
FIG. 4 is a flowchart illustrating steps that can be taken to determine if a code snippet can be considered a code hook.

Code Hooks:

Referring to the flowchart of FIG. 4, beginning with code snippet A with a specific functionality that can be referenced as A (block 40), an action is attempted with the code snippet (block 42). A determination is then made as to whether there is any code snippet B provided by the analysis developer that executes before or after the action of code snippet A (block 44). If there is a code snippet B provided by the analysis developer that executes before or after the action of code snippet A, the code snippet B is considered a code hook (block 46). Alternatively, if there is no code snippet B provided by the analysis developer that executes before or after the action of code snippet A, the code snippet B cannot be considered a code hook (block 48).

Figure 5:
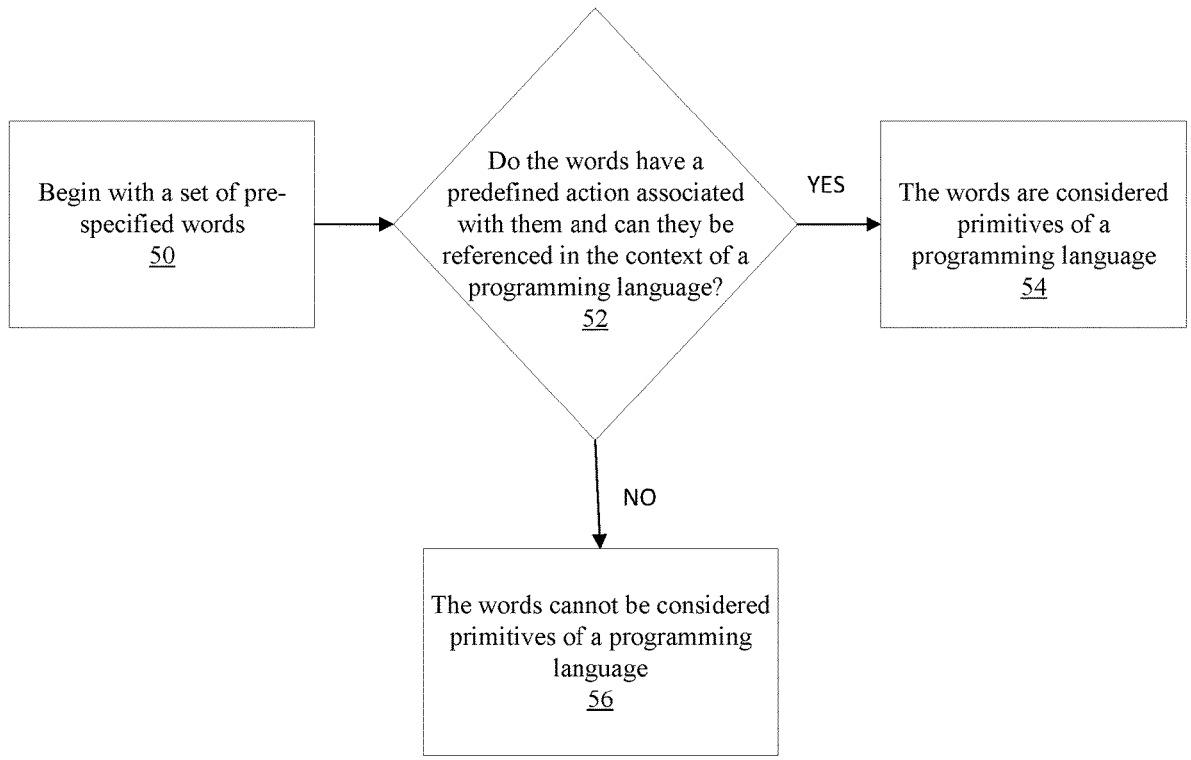
FIG. 5 is a flowchart illustrating steps that can be taken to determine if a set of prespecified words can be considered primitives of a programming language.

Language Primitives:

Referring to the flowchart of FIG. 5, beginning with a set of pre-specified words (block 50), a determination is made as to whether the words have a predefined action associated with them and can be referenced in the context of a programming language (block 52). If the words have a predefined action associated with them and can be referenced in the context of a programming language, the words are considered primitives of a programming language (block 54). Alternatively, if the words do not have a predefined action associated with them and/or cannot be referenced in the context of a programming language, the words cannot be considered primitives of a programming language (block 56).

Figure 6:
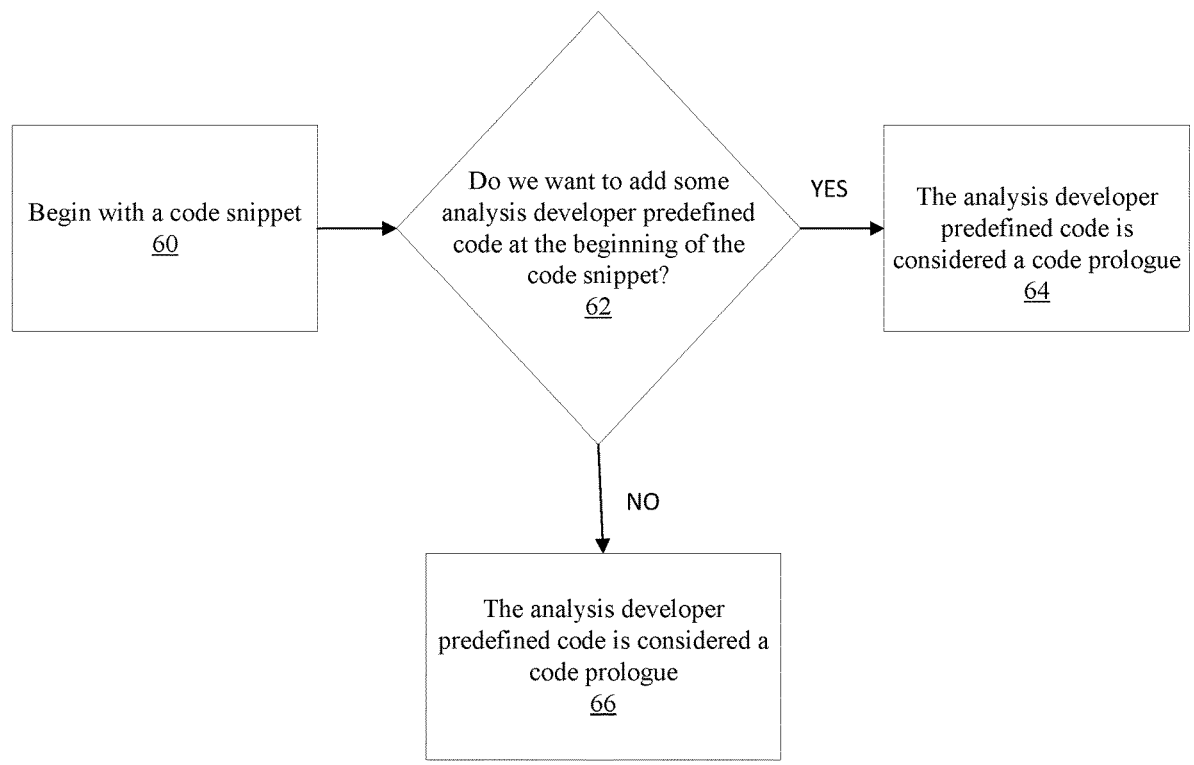
FIG. 6 is a flowchart illustrating steps that can be taken to determine if analysis developer predefined code can be considered a code prologue.

Code Prologue:

Referring to the flowchart of FIG. 6, beginning with a code snippet (block 60), a determination is made as to whether to add some analysis developer predefined code at the beginning of the code snippet (block 62). The software developer using the present system and method determines whether to add analysis code, presumably, when they are seeking to extract information. If we want to add some analysis developer predefined code at the beginning of the code snippet, the analysis developer predefined code is considered a code prologue (block 64). Alternatively, if we do not want to add some analysis developer predefined code at the beginning of the code snippet, the analysis developer predefined code is not considered a code prologue (block 66).

Figure 7:
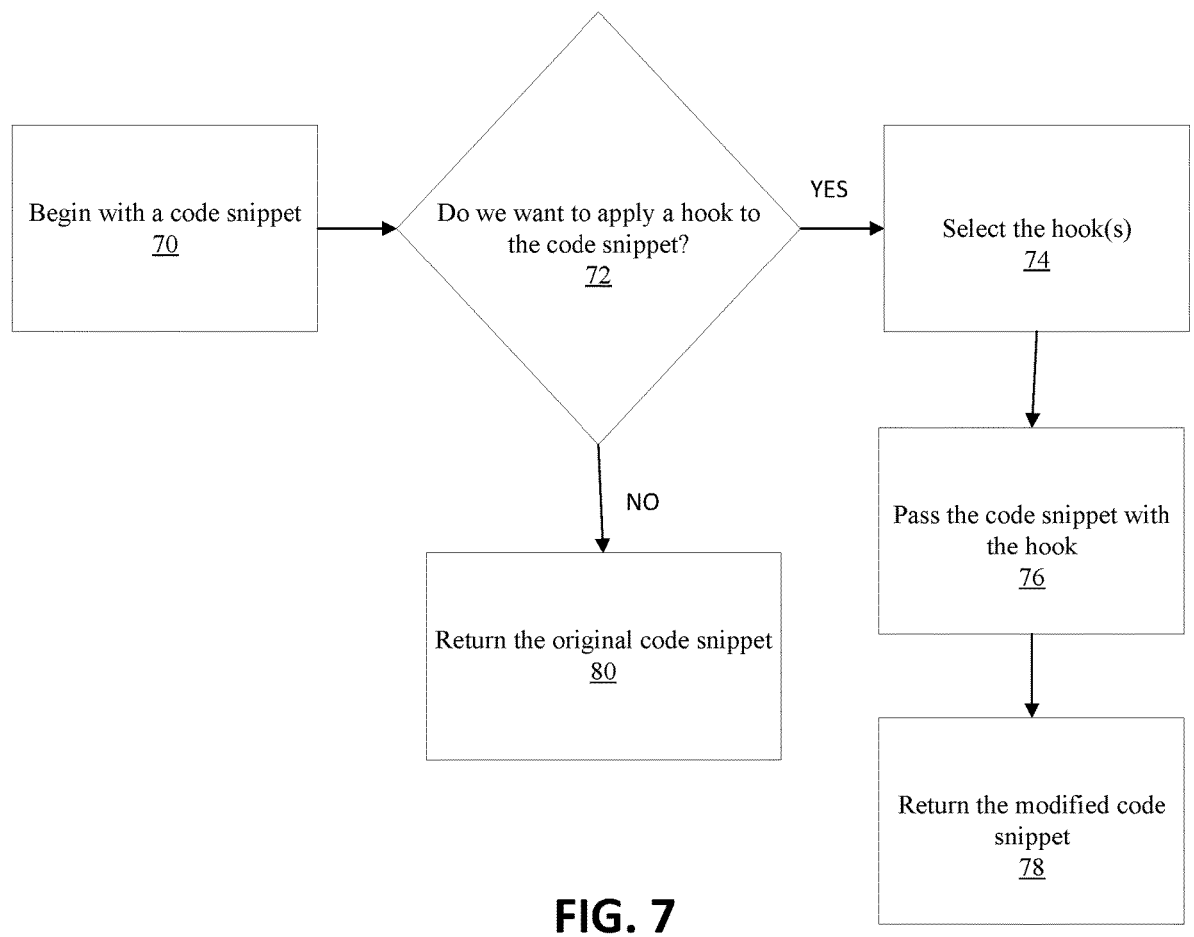
FIG. 7 is a flowchart illustrating steps that can be taken to wrap a code snippet with a hook.

Wrapping:

Referring to the flowchart of FIG. 7, beginning with a code snippet (block 70), a determination is made as to whether to apply a hook to the code snippet (block 72). The criteria used to determine whether to apply a hook is whether to analyze the code about to be wrapped. If there is a desire to analyze the code, a hook is applied, otherwise, no hook is applied. If we want to apply a hook to the code snippet, the hooks are selected (block 74), after which the code snippet is passed with the hook (block 76), and then the modified code snippet is returned (block 78). Alternatively, if we do not want to apply a hook to the code snippet, the original code snippet is returned (block 80). This process is referred to as wrapping.

Module Recontextualization

As is described herein in detail, the present system and method contains dynamically modified functionality that is performed by the present module recontextualization system 100, which is responsible for importing and loading software modules from the third-party library 200. Instead of simply locating and loading modules from the library 200 file system, the library 200 yields control to the module recontextualization system 100, which applies a series of transformations to software modules with the goal of interposing at their boundaries. The following provides an overview of the present system and method, highlighting several key challenges, followed by a detailed description of each step performed by the present system and method.

Overview

Figure 8:
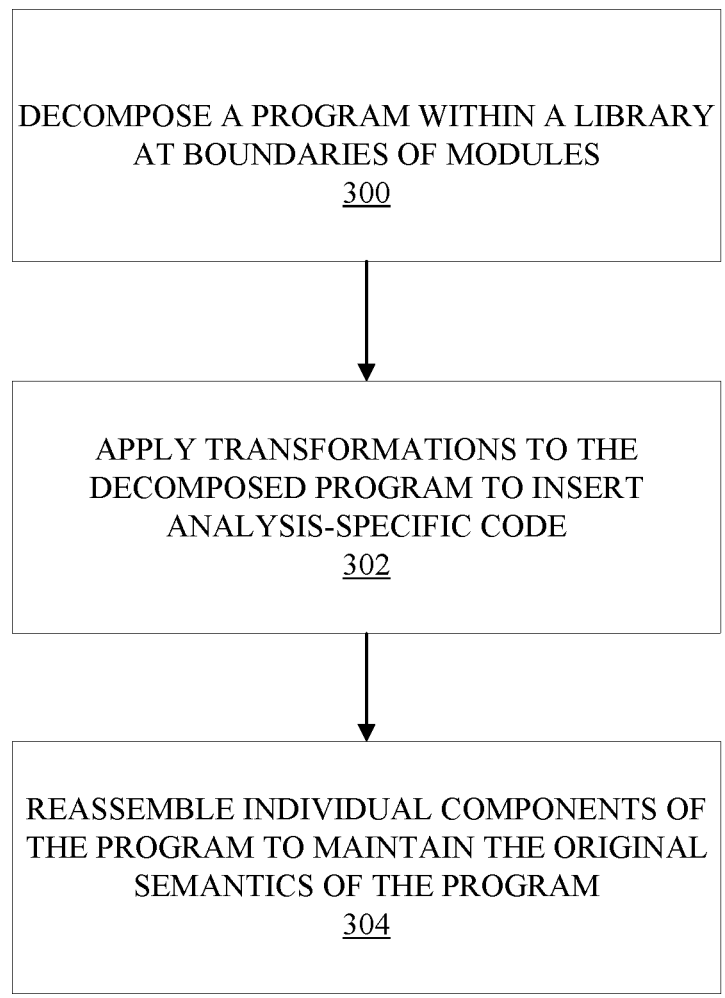
FIG. 8 is a flowchart illustrating steps taken by the present system and method to provide analysis and steering of third-party libraries.

FIG. 8 is a flowchart illustrating steps taken by the present system and method to provide analysis and steering of third-party libraries. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

As shown by the flowchart of FIG. 8, the present system and method operates by first decomposing a program within a library at the boundaries of modules of the program (block 300). As shown by block 302, transformations are then applied, which insert analysis-specific code into the modules, also referred to herein as module recontextualization. Individual components are then carefully reassembled to maintain original semantics of the software modules (block 304).

The step of decomposing a program within a library (block 300) starts by recursively decomposing a program into its dependencies. This is achieved by rewiring an import function of the program language to be processed through the module recontextualization system 100 (FIG. 1), resulting in the module recontextualization system 100 walking the recursive dependency structure of the program at runtime. During this phase, the module recontextualization system 100 determines granularity of the analysis (e.g., top-level modules, a specific module etc.) in order to apply transformations at the appropriate level and map provided analysis hooks to the corresponding modules. The appropriate level is determined by knowing to which module the analysis is applied or knowing where in a dependency tree the current program is.

The step of applying transformations (block 302) includes the module recontextualization system 100 setting up the provided analysis, by transforming each module interface, its surrounding environment, and optionally, the values passing through the module boundary. Programmatic transformations walk and wrap each one of these values based on their type. This step requires solving several challenges, including enumerating all points of entry into a module and exit out of a module, and swapping all original values externally available to a module with ones that are wrapped with interposition mechanisms, otherwise known as analysis-specific code. This step is further described in additional detail herein.

Referring to the step of reassembly (block 304), the present system and method reassembles individual modified modules back into the original structure of the program. A key challenge in this step is treatment of cache of the module, which needs to be augmented to support multiple wrappers per module, each capturing a part of the overall analysis.

Example—Counting Global Accesses

The following presents an exemplary analysis that counts all accesses to global variables from a simple-math module that may be located within the third-party library:

```
let fs = import("fs");
let count = { };
forevery.global.inlib(/simple-math/).analyze( {
    pre: (name, path, _) => {
        let o = resolve(name, path);
        count[o] = count[o]? count[o] + 1 : 1;
    } });
process.on("exit", ( ) => { fs.writeFileSync(
    "access.json", "utf-8", JSON.stringify(count)); });
```

In accordance with this example, for every generates a set of module identifiers. The inlib field is a method that takes a regular expression matching module identifiers. If not empty, pre and post hooks are called before and after each access of the elements specified in the set. Finally, resolve is a method for traversing an object given a path within that object. Upon program exit, the results are written to disk, all using expected Node Application Programming Interfaces (APIs).

To perform this analysis, the present system and method first interposes on the import call of the module to detect when the simple-math module is loaded. When loading the simple-math module, the present system and method applies (1) a source-to-source program transformation that redefines global identifiers as module-local ones, and (2) a dynamic metaprogramming, such as a runtime reflection, transformation to traverse global values and create a global-indirection map specific to the simple-math module. For every global identifier the map holds modified global values that are wrapped such that any access to these values from within the simple-math module is visible by the module recontextualization module 100, which upon access calls the corresponding pre hook. Finally, the present system and method interprets the transformed simple-math module using the built-in code evaluation primitive, effectively linking the module-local identifier lookups to the map entries that hold the modified values corresponding to these identifiers. The following further elaborates upon the decomposing, applying transformations, and reassembling steps, as performed by the present system and method.

Decomposition

Figure 9:
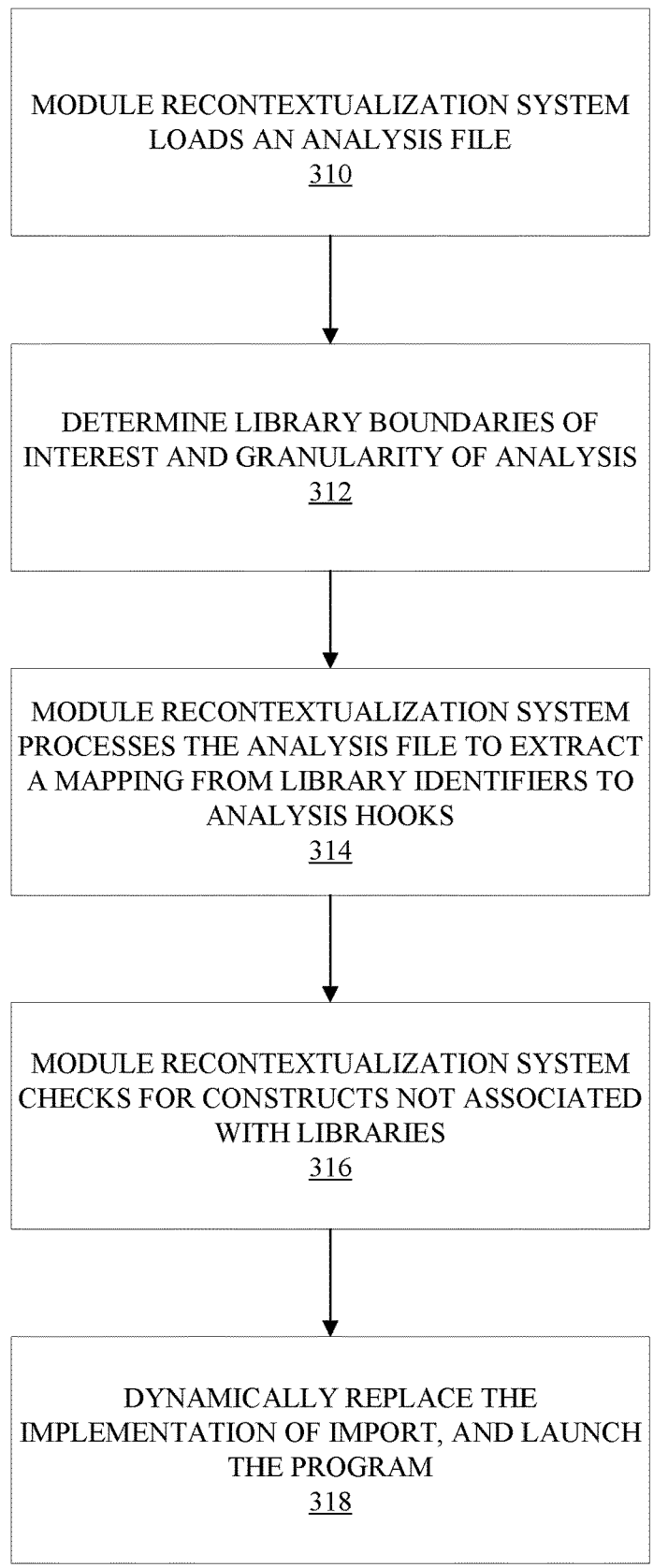
FIG. 9 is a flowchart further illustrating steps taken during the decomposition step of FIG. 8.

FIG. 9 is a flowchart further illustrating steps taken during the decomposition step (block 300) of FIG. 8. Referring now to FIG. 9, as shown by block 310, when the present system and method augmented program begins, the module recontextualization system loads an analysis file provided by a software developer. Such an analysis file could be provided from the software developer computer 250 (FIG. 1). The analysis file specifies a subset of libraries within the third-party library 200 (FIG. 1) whose boundaries are of interest or a subset of libraries that should not be analyzed. The module recontextualization system 100 (FIG. 1) needs to determine the library boundaries of interest and the granularity of analysis (block 312). To do this, the module recontextualization system 100 (FIG. 1) extracts an approximation of a dependency graph by traversing library files within the third-party library 200 (FIG. 1). Using this graph, the module recontextualization system 100 (FIG. 1) processes the analysis file to extract a mapping from library identifiers to analysis hooks (block 314). The module recontextualization system 100 (FIG. 1) also checks for constructs not associated with libraries (block 316), for example, whether the analysis includes global variables, library-local constructs, standard libraries, or others. As shown by block 318, the module recontextualization system 100 (FIG. 1) then proceeds to dynamically replace the implementation of import and launch the program, rather than simply locating and loading a library. In accordance with the present system and method, any calls to import now yield to the module recontextualization system 100 (FIG. 1).

Although not required, it is preferred that for invocations of import, the module recontextualization system 100 (FIG. 1) checks the cache of the system 100 (FIG. 1) to determine (i) if the library 200 has already been loaded, and (ii) whether the library has been loaded with the same analysis hooks. If both are determined true, the module recontextualization system 100 (FIG. 1) retrieves the cached version of the library and returns the transformed exported value. If the library was loaded with a different analysis, for instance, because there are different analyses applied to different parts of a dependency tree, the module recontextualization system 100 (FIG. 1) constructs the appropriate analysis and applies a transformation pass on a cached copy of the unmodified library. Otherwise, the module recontextualization system 100 (FIG. 1) first invokes the built-in library loader to locate the library.

The process of loading new libraries includes (i) a phase of reading the necessary source files and (ii) a phase of interpreting the source files, interspersed by applications of transformations. Reading the source files returns a string representation of the code; interpretation uses the language's runtime evaluation primitives to convert the code into an in-memory object.

Figure 10:
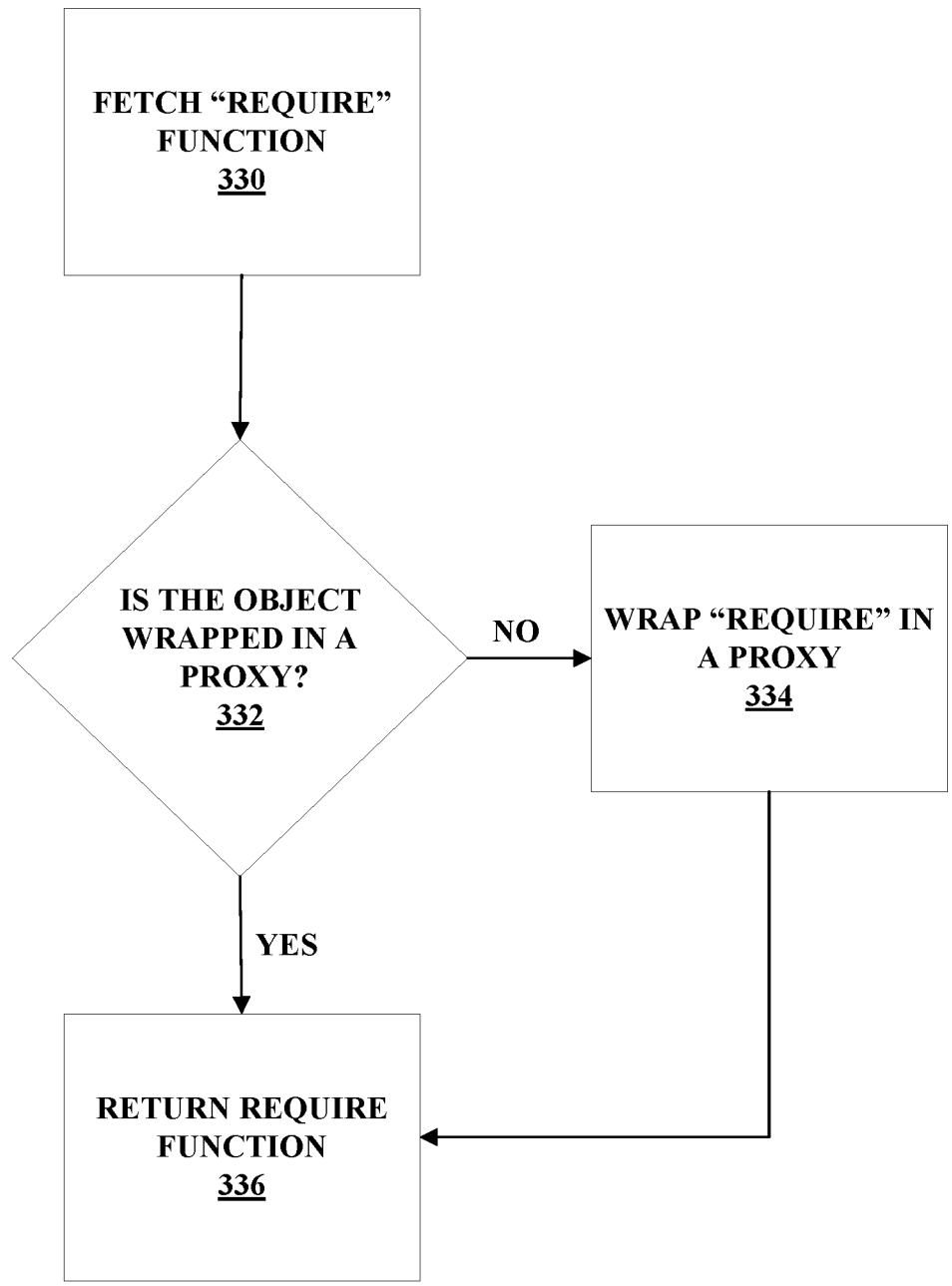
FIG. 10 is a flowchart further illustrating the process of loading new libraries in accordance with a first exemplary embodiment of the invention.

FIG. 10 is a flowchart further illustrating the process of loading new libraries in accordance with a first exemplary embodiment of the invention, using the example of the following code being located within the library.

let math=require("math");
let result=math.add(1, 2);

As shown by block 330, the module recontextualization system fetches the "require" function from the library. A determination is then made regarding whether the object is wrapped in a proxy (block 332). If the object is not wrapped in a proxy, the object "require" is wrapped in a proxy (block 334), after which the wrapped "require" object is returned to the module recontextualization system (block 336). In addition, if during the previous step (block 332) it was found that the object is wrapped in a proxy, the proxy wrapped object would be returned to the recontextualization system (block 336).

Figure 11:
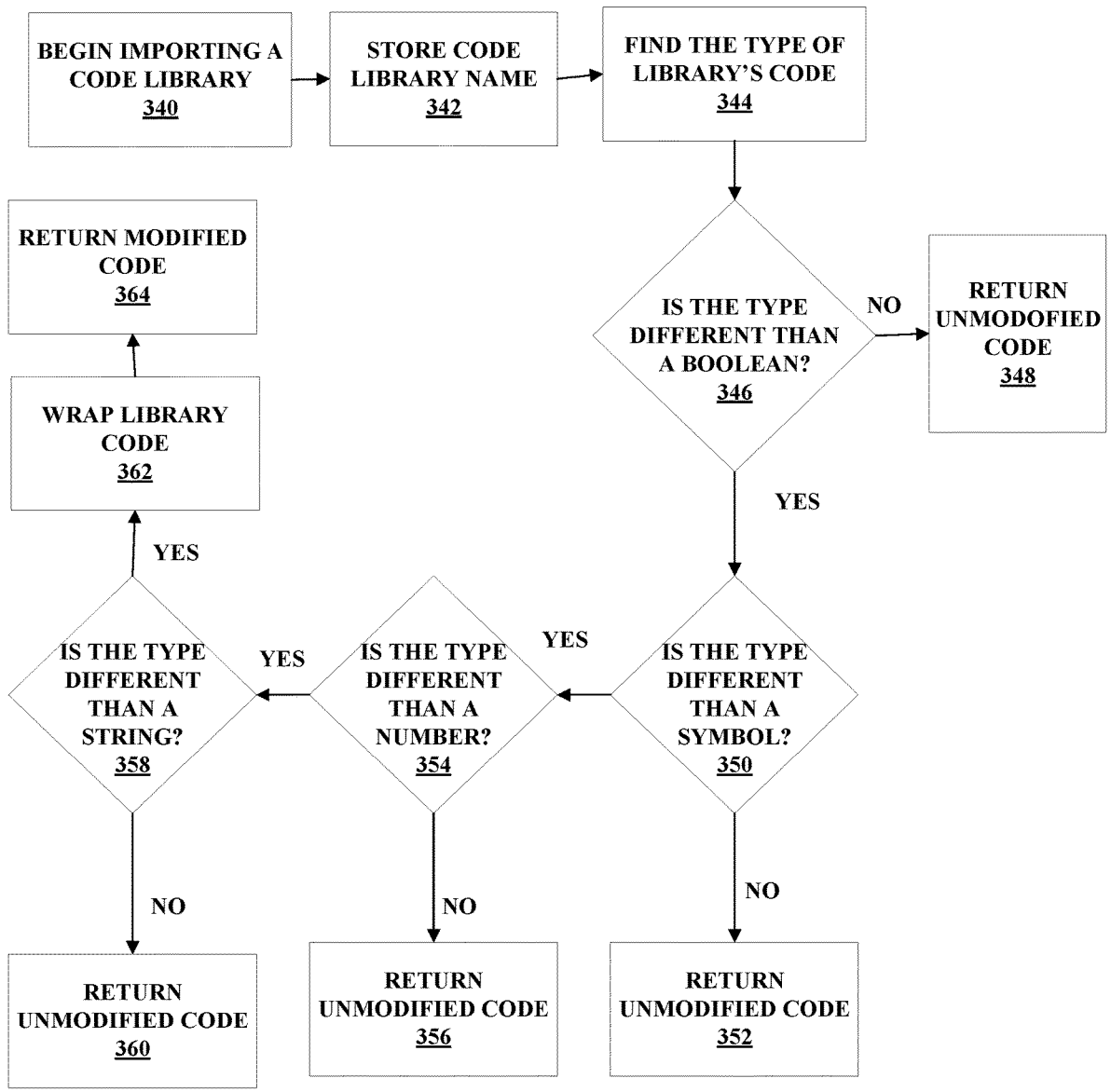
FIG. 11 is a flowchart further illustrating the step of importing code from a code library.

FIG. 11 is a flowchart further illustrating the step of importing code from a code library. As shown by block 340, the process of importing a code library is initiated by the module recontextualization system 100 (FIG. 1). The code library name is then stored by the module recontextualization system 100 (FIG. 1). A type of library code is then determined (block 344), after which a determination is made as to whether the type of library's code is a Boolean (block 346). If the type is not different than a Boolean, unmodified code is returned in response to the begin importing a code library request (block 348). If the type is different than a Boolean, a determination is made as to whether the library's code type is different that a symbol (block 350). If not different than a symbol, unmodified code is returned in response to the begin importing a code library request (block 352).

If the type of library's code is different that a symbol, the module recontextualization system 100 (FIG. 1) determines if the type is different that a number (block 354). If not different that a number, the unmodified code is returned (block 356). If the type of library's code is different than a number the module recontextualization system 100 (FIG. 1) determines if the type is different that a string (block 358). If not different than a string, the unmodified code is returned (block 360). If however, the type is not different than a string, the library code is wrapped (block 362), after which the now modified code is returned to the module recontextualization system 100 (FIG. 1) (block 364).

Some analyses may themselves make use of global variables, libraries, and other analyzable constructs. As these will be part of the same execution context, the module recontextualization system 100 (FIG. 1) makes note to avoid transforming and wrapping these constructs as part of the analysis. The module recontextualization system 100 (FIG. 1) frameworks may also want to add analysis-specific keywords not provided by the source file language. To achieve this, the module recontextualization system 100 (FIG. 1) wraps each analysis hook with a function whose body starts by defining the expected keywords. The precise techniques for achieving this will be made clear in the following description, after describing transformations. A key point to remember is that analyses are initially represented as source strings, similar to libraries.

For each analyzed library, the module recontextualization system 100 (FIG. 1) needs to place hooks around its boundary—not just its interface entry points. FIG. 12 demonstrates an exemplary algorithm illustrating positioning of analysis hooks. As show by FIG. 12, the algorithm is presented in functional style to simplify variable binding. Different types are illustrated such as object, list, function, and primitive, which may be used for pattern matching. The functions $\alpha 1$, $\alpha 2$, and $\alpha 3$ stand for the locations of analysis hooks.

Figure 13:
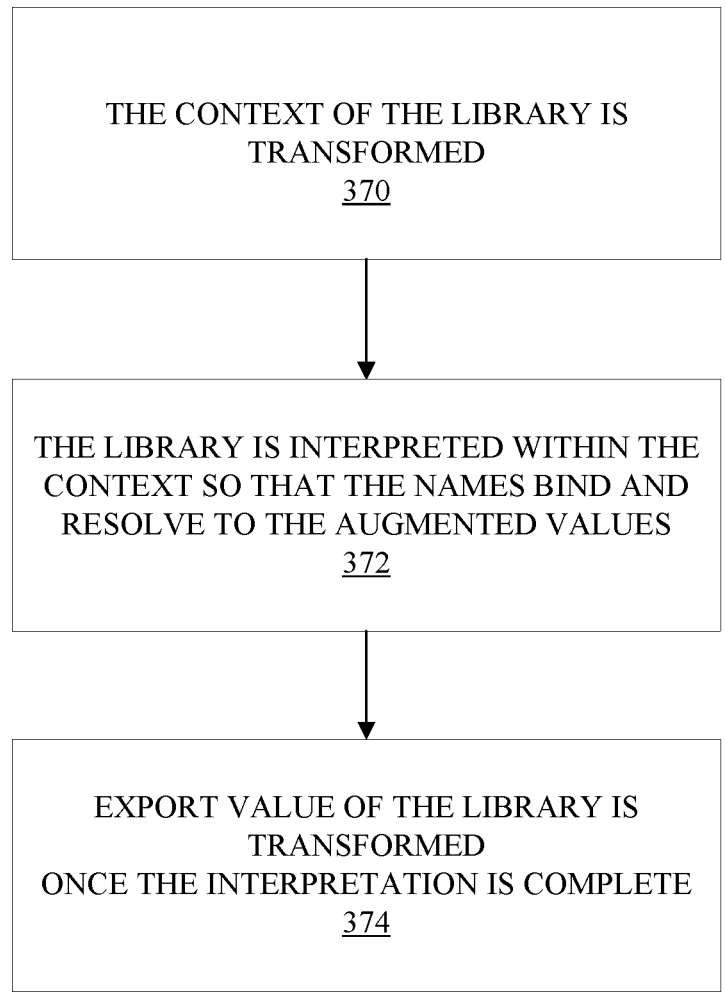
FIG. 13 is a flowchart further illustrating the process of placing hooks around the boundary of the library.

The process of placing hooks around the boundary of the library is achieved in three logical steps, as illustrated by the flowchart of FIG. 13: (i) transforming the context of the library, which is a mapping from names to values that are available from outside the library (block 370); (ii) interpreting the library within this context, so that all names bind and resolve to the augmented values of the module recontextualization system 100 (FIG. 1) (block 372); and (iii) transforming the export value of library, i.e., the library interface, once the interpretation is complete (block 374). Prior to describing where each transformation is applied, the following shows how the transformations are applied.

Figure 14:
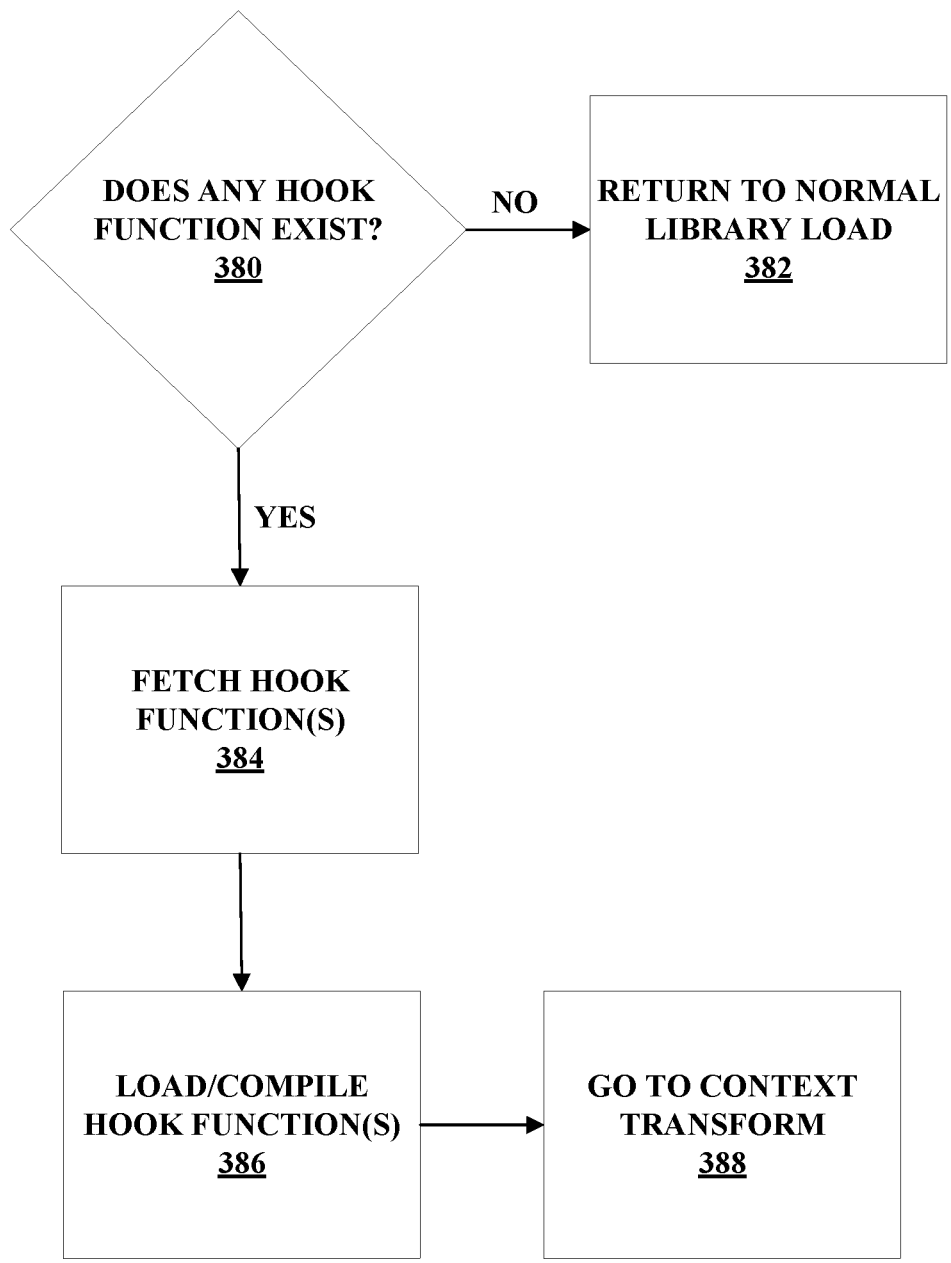
FIG. 14 is a flowchart further illustrating hook parsing in accordance with the present system and method.

FIG. 14 is a flowchart further illustrating hook parsing in accordance with the present system and method. As shown by block 380, a determination is first made as to whether any hook function exists (block 380). If not, the system returns to normal library load (block 382). If a hook function does exist, the hook functions are fetched by the module recontextualization system 100 (FIG. 1) (block 384). Hook functions are then loaded or compiled (block 386), after which the module recontextualization system 100 (FIG. 1) goes to context transformation, as described in further detail herein (block 388).

Transformations

Transformations of the module recontextualization system 100 (FIG. 1) are to a base transform wrap that traverses and augments values with runtime analysis monitors. As per FIG. 12, wrap takes a value v and analysis fragments ($\alpha 1$, $\alpha 2$) and returns a new value v' that has every one of its fields f wrapped: every f is replaced with a method f' that calls fragment $\alpha 1$, calls f, calls fragments $\alpha 2$, and returns the result of the call to f.

More specifically, wrap can be applied to any value in the language, which can generally be a primitive, a function, or a compound value, an example of which may be, but is not limited to, a list of values or an object of key-value pairs. Transformations walk compound values from their root, processing component values based on their types. More specifically: (i) function values are wrapped by closures that contain analysis-specific hooks, (ii) object and list values are recursively transformed, with their getter and setter methods replaced like function values; and (iii) primitive values are either transformed directly or copied unmodified and wrapped with an access interposition mechanism. To avoid cycles during the walk, values are added to a map that is consulted at the beginning of each recursive call by the module recontextualization system 100 (FIG. 1).

Figure 15:
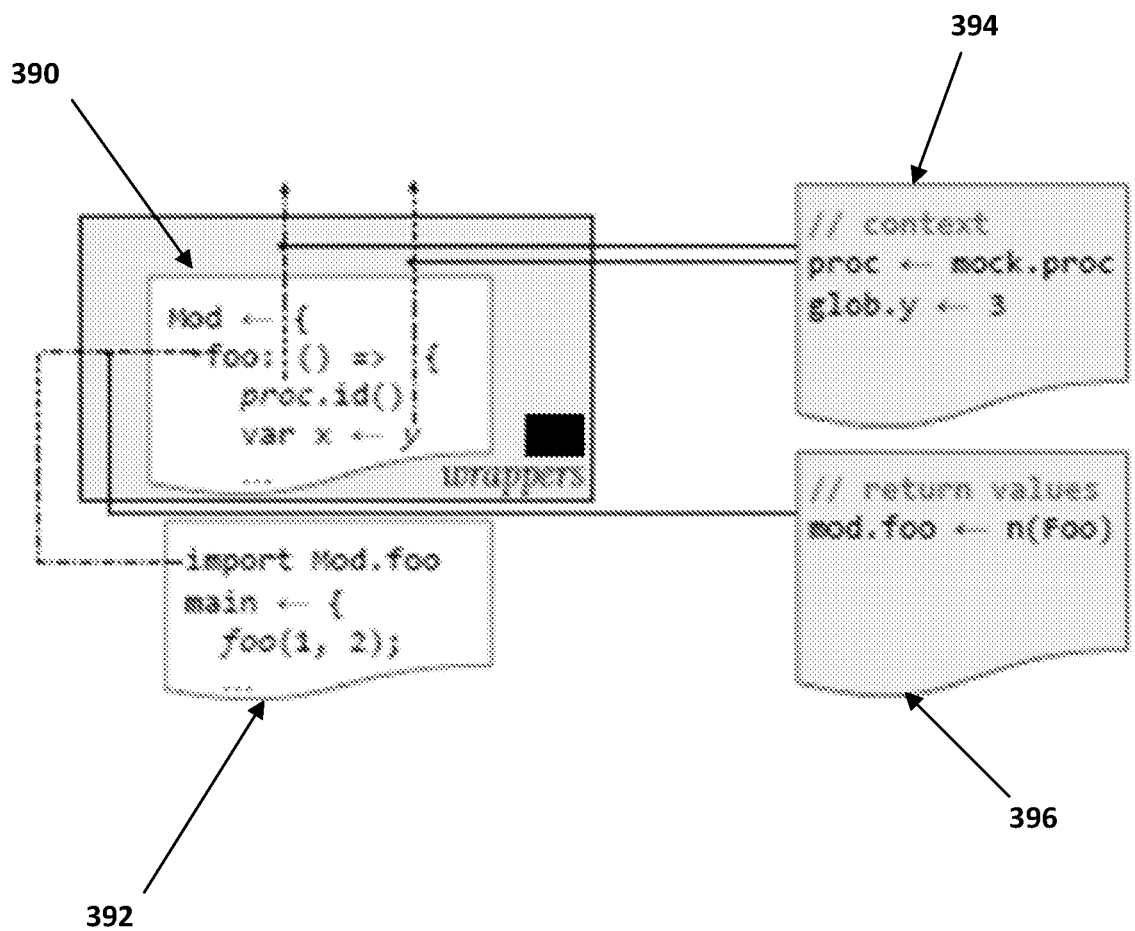
FIG. 15 provides an illustration displaying transformation of code within a library, in accordance with the present system and method.

FIG. 15 provides an example of transformation of code within a library, in accordance with the present invention. In FIG. 15, the non-shadowed portion of the code 390, 392, is the code of the library prior to the present system and method applying functionality. For the shadowing segments, cross-module variable name resolution is illustrated to the left as the white filled boxes 390, 392, while the augmentation provided by the present system and method is illustrated as the grey filled boxes 394, 396, which interjects non-bypassable steps resolving to augmented values using implicit module imports, as illustrated by block 394, and using explicit import, as illustrated by block 396.

Direct field accesses, such as assignments, require detection upon access. To achieve this, the module recontextualization system 100 (FIG. 1) wraps fields with an interposition mechanism, also referred to analysis-specific code; this mechanism essentially treats direct field accesses as function calls. Extending a transformed object with a value starts with transformation of the value. For example, if a field in a transformed object is assigned a new value, that value must be transformed before it is attached to the object.

The module recontextualization system 100 (FIG. 1) allows toggling analyses on/off, changing analyses, or chaining multiple analyses during the execution of the program. To achieve this, it maintains a handle to the root of both the unprocessed and the newly processed values, for further processing. Specifically, the unprocessed value is used to create objects, at runtime, that run different analyses, and the new value is used to revoke or chain analyses together.

Context Transformation: To be able to track an analysis at the library boundary, the present system and method needs to provide each library with values that are augmented with interposition wrappers—and do this for all of the names to which a library has access. This includes global and pseudo-global names provided by the language and its runtime. To achieve this, the present system and method first needs to prepare a transformed copy of the library's context—a map from variable names that are (expected to be) in scope to their values. The present system and method creates an auxiliary hash table mapping names to transformed values. Names correspond to any name that, by the language definition, is accessible by the library and resolves to a value outside that library, such as globals, builtins, module-locals, etc.

Transformed values are created by applying wrap to values in the context, adding the provided analysis hooks.

An non-limiting example of a context map follows:

```
var CONTEXT = {
    module_name: "this module",
    three: 3,
    toString: global.toString
}
```

This context map maps the name "module_name" to "this module", the name "three" to the value "3", and the name "toString" to the value pointed to by "global.toString".

Figure 16:
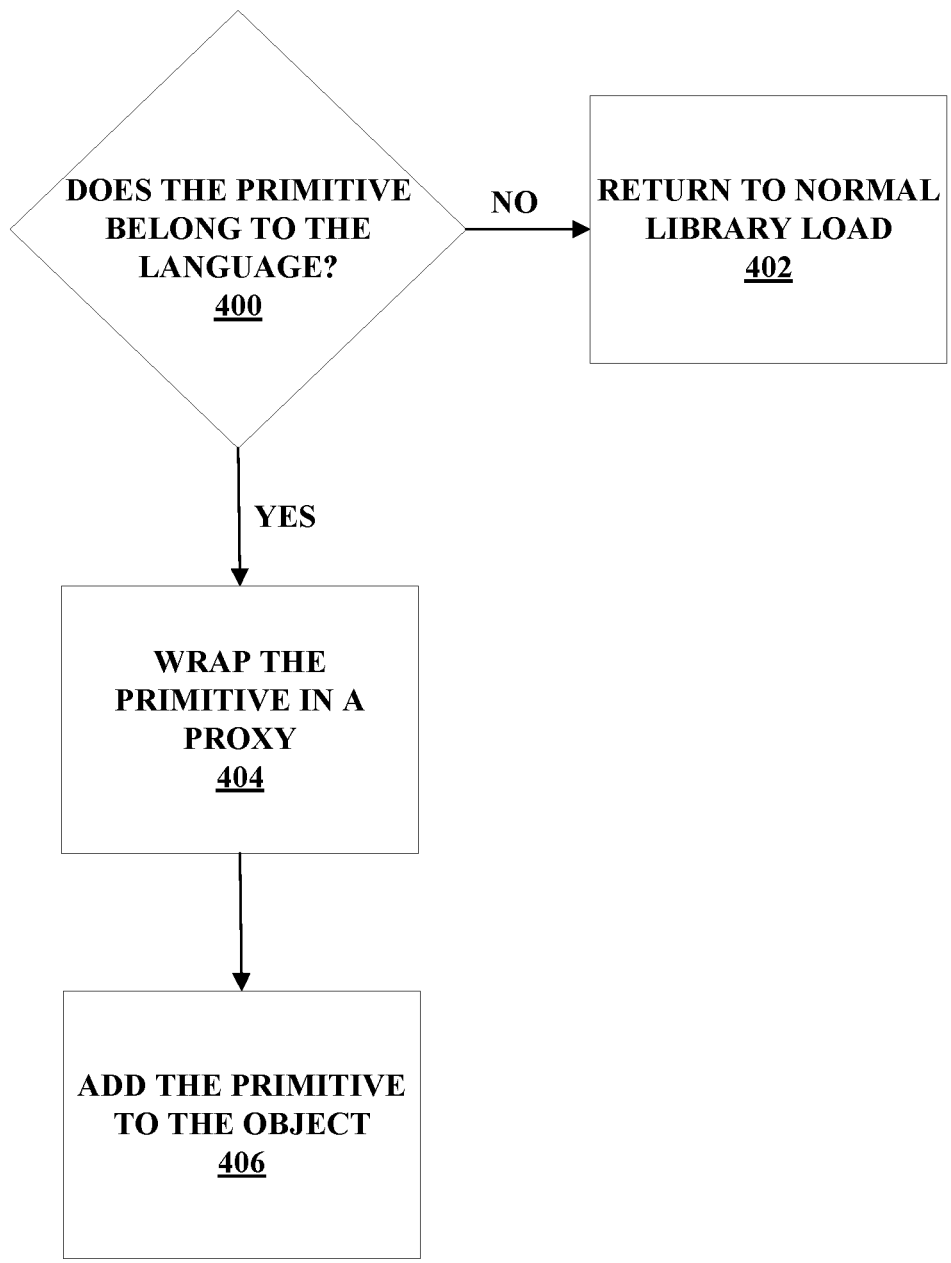
FIG. 16 is a flowchart further illustrating steps taken during context transformation.

It will be recalled that with regard to language primitives, as previously demonstrated by FIG. 5, the module recontextualization system 100 (FIG. 1) begins with a set of pre-specified words and makes a determination as to whether the words have a predefined action associated with them and can be referenced in the context of a programming language. If the words have a predefined action associated with them and can be referenced in the context of a programming language, the words are considered primitives of a programming language. Alternatively, if the words do not have a predefined action associated with them and/or cannot be referenced in the context of a programming language, the words cannot be considered primitives of a programming language. With this in consideration, to perform context transformation, as shown by the flowchart of FIG. 16, the present module recontextualization system 100 (FIG. 1) determines if the primitive belongs to the programming language (block 400). If the primitive does not belong to the programming language, the normal library load is returned (block 402). Alternatively, if the primitive does belong to the programming language, the primitive is wrapped in a proxy (block 404), after which the primitive is added to the object (block 406). With the wrapping of the primitive in a proxy, the module recontextualization system can also pass a predefined code snippet as a hook prior to adding the primitive to the object.

In many situations, there will be a desire to check for more than one primitive. In such situations, a sequence of checks may be performed by the module recontextualization system 100 (FIG. 1). For example, after adding the primitive to the object, the system 100 (FIG. 1) can determine if there are any remaining primitives. If there are remaining primitives, the next primitive can be parsed.

Care must be taken with library-local variables. These are accessible from anywhere within the scope of a library (similar to global variables) but resolve to a different value for each library. Examples include the library's absolute filename as _name_, its exported values, and whether the library is invoked as the application's main library. Attempting to access library-local variables directly from within the present system and method's scope will fail subtly, as they will end up resolving to library-local values of the present system and method itself—and specifically, the module that is applying the transformation. The present system and method solves this problem by leaving the value empty and deferring binding for later from within the scope of the library.

Context Binding

To link the library with the newly transformed version of its context, the present system and method wraps the library—still an uninterpreted string of source code—with a closure. The closure's body starts with a prologue of the form, and example of which follows, although the present system and method is not limited to this example:

local print=ctx.print
local error=ctx.error
// . . . more entries . . .

These statements shadow global variable names by redefining them as function-local ones. The closure accepts an argument ctx that will hold the customized context, assigning its entries to their respective variable names. The prologue executes before everything else in the library. This process leverages lexical scoping to inject a non-bypassable step in the variable name resolution process: instead of resolving to variables in the context, resolution will first "hit" library-local values augmented with analysis monitors.

Late-bound, library-local variables, such as the absolute filename mentioned during context creation, are the result of applying wrap over variable names in the current scope; these names are now bound to the correct library-local values.

Figure 17:
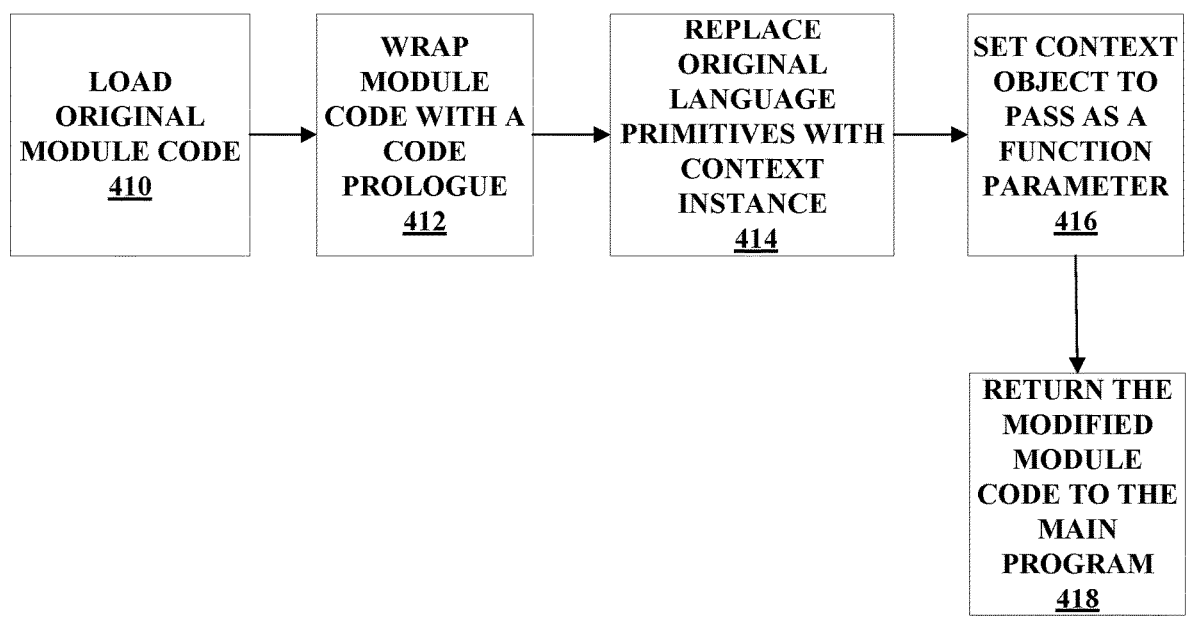
FIG. 17 is a flowchart further illustrating steps associated with enclosing a module.

FIG. 17 is a flowchart further illustrating the steps associated with enclosing a module, as described herein. As shown by block 410, the original module code is loaded. The module code is then wrapped with a code prologue, as previous mentioned (block 412). The original language primitives are then replaced with the context instance (block 414), after which the context object is set to pass as a function parameter (block 416). Finally, the modified module code is returned to the main program.

Figure 18:
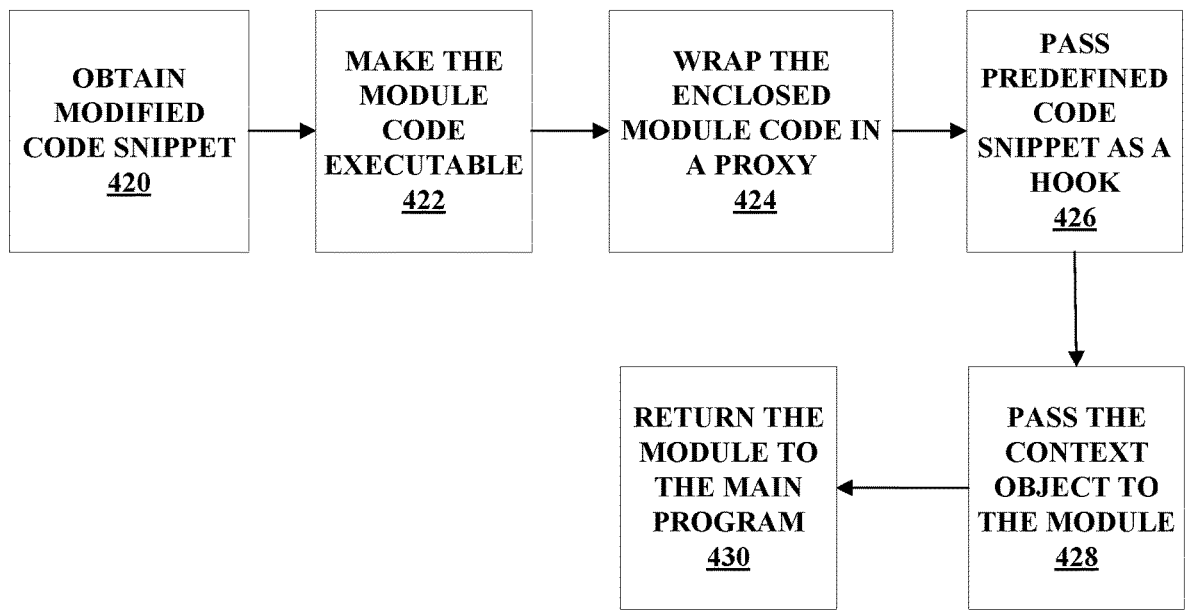
FIG. 18 is a flowchart illustrating steps taken during further processing of the returned modified module code, in accordance with the present system and method.

The returned modified module code then has further processing for use, as explained with regard to FIG. 18. Referring to FIG. 18, as shown by block 420, a code snippet is obtained, after which the module code is made executable (block 422). The enclosed module code is then wrapped in a proxy (block 424). The predefined code snippet is then passed as a hook (block 426). The context object is then passed to the module (block 428), after which the module is returned to the main program (block 430).

Library Interface Transformation

Returning the library's value to its consumer amounts to interpreting the library, linking it with the custom context, and applying a final transformation to its return value. The goal of the final transformation is to track activity at the boundary. This final transformation is applied for every new consumer of the library, returning a fresh analysis wrapper. This is due to the need for distinguishing between different boundaries of the same library. The treatment of this feature during reassembly is explained herein with regard to the following section focused on reassembly.

Reassembly

To successfully reassemble the application, after processing as previously mentioned, the module recontextualization system 100 (FIG. 1) needs to ensure that cross-references between libraries resolve correctly. The central mechanism for this resolution is the library cache. To support multiple wrappers for a single cached library, the cache is extended by two levels, for a total of three. The reason for adding the two levels is that libraries are usually governed by a single context analysis but multiple interface analyses, one for each of their consumers. A context transformation is applied at most a few times (usually only once), whereas a return-value transformation is applied on every import. Thus, the first level is indexed by library identifiers (as before); the second by context analysis; and the third by analysis of the exported interfaces. For each library, the second level contains a collection of entries corresponding to mostly transformed libraries, and the third level contains fully transformed libraries. Mostly transformed libraries have gone through the entire transformation pipeline except for the last stage: they have been interpreted and have had their context transformed and linked, but their return value has not been processed to track analysis of its interface.

A special entry is reserved for the original library value as a string, so that subsequent transformations can skip loading it from disk. When a new analysis is applied to a library, the present system and method indexes the cache by library identifier and applies the analysis-specific wrap to the library's context. It then adds that result to a slot in the next layer of the cache, indexed by the analysis identifier. When a library is already loaded, the present system and method indexes by analysis to retrieve the (mostly) transformed library corresponding to this analysis. It then applies a transformation to the library's return value and inserts the (finalized) transformed library to the third layer of the cache.

The claimed invention is directed towards programming languages in widespread use and offering the features modules—examples include JavaScript, Python, and Lua. Millions of developers today using these languages can benefit from the claimed invention.

One having ordinary skill in the art will appreciate that the previously mentioned steps performed by the module recontextualization system 100 (FIG. 1) may be provided as modules within a general computer system, server, or any system containing a memory and a processor. For exemplary purposes, FIG. 19 is a schematic diagram illustrating a system containing a memory that would have the modules described herein.

Figure 19:
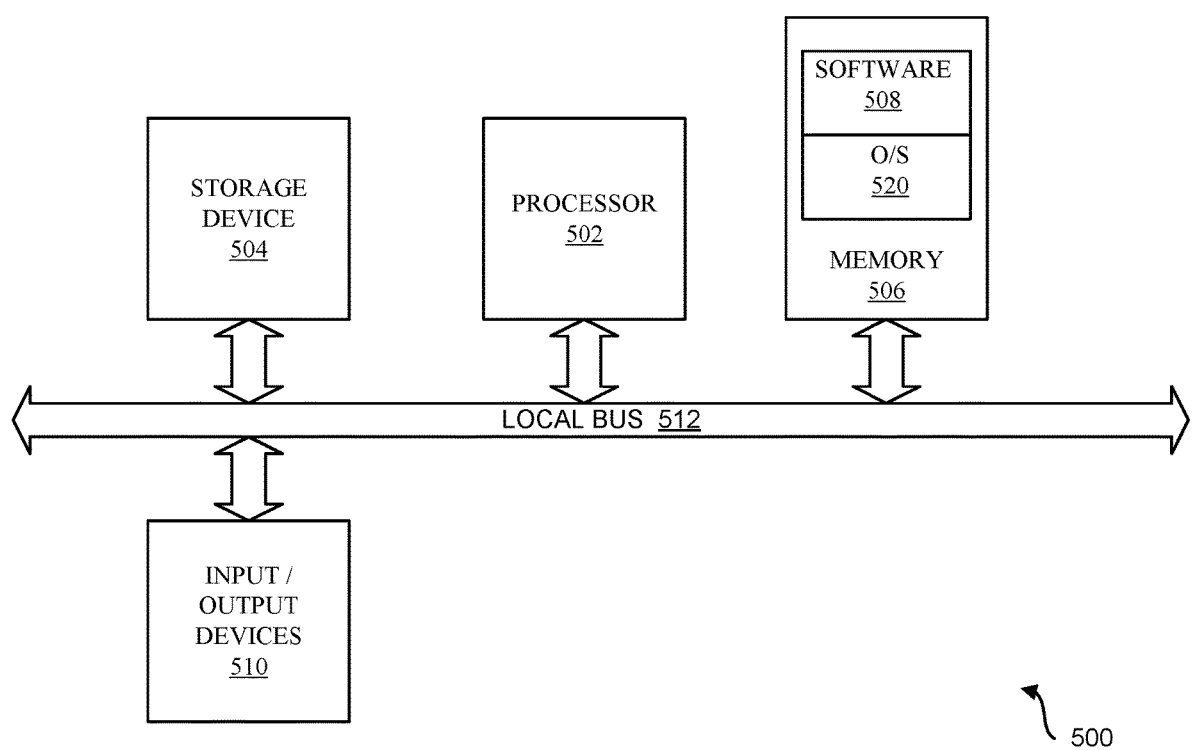
FIG. 19 is a schematic diagram further illustrating an example of the module recontextualization system of FIG. 1.

As mentioned, the module recontextualization system 100 (FIG. 1) described in detail herein may be a computer, an example of which is shown in the schematic diagram of FIG. 19. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention, as described above with reference to the modules. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above. When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be noted that the examples provided in this disclosure are provided for exemplary purposes and are not intended to limit the present invention.

We claim:

1. A system for analysis and steering use of third party libraries, comprising:
    program source code comprising a plurality of modules;
    at least one third party library; and
    a processor and a memory configured to store non-transitory instructions that, when executed by the processor, run a module recontextualization application configured to:
        decompose a program within the third-party library at boundaries of modules of the program, into the program's dependencies;
        apply transformations to the decomposed program to insert analysis specific code, including a base transform wrap that traverses and augments values with runtime analysis monitors; and
        reassemble individual components of the decomposed program to maintain original semantics of the program while incorporating the transformations that were applied to the decomposed program.

2. The system of claim 1, wherein the module recontextualization application decomposing a program within the third-party library, includes the module recontextualization application being configured to:
    load an analysis file;
    determine library boundaries of interest and granularity of analysis; and
    processing the analysis file to extract a mapping from library identifiers to analysis hooks.

3. The system of claim 1, wherein the module recontextualization application decomposing a program within the third-party library, includes the module recontextualization application being configured to:
    check for constructs not associated with libraries; and
    dynamically replace implementation of import to reference the module recontextualization application.

4. The system of claim 1, wherein the module recontextualization application decomposing a program within the third-party library, includes the module recontextualization application being configured to:
    retrieve an object of interest from the third-party library;
    determine if the object is wrapped in a proxy; and
    wrap the object of interest in a proxy.

5. The system of claim 1, wherein the module recontextualization application applying transformations to the decomposed program to insert analysis specific code includes the module recontextualization application being configured to:
    determine if a hook function exists;
    retrieve hook functions; and
    load hook functions.

6. The system of claim 1, wherein the module recontextualization application applying transformations to the decomposed program to insert analysis specific code includes the module recontextualization application being configured to:
    determine whether a primitive belongs to a specific language of the program;
    wrap the primitive in a proxy; and
    add the primitive to an object of the program.

7. A computer performed method for analysis and steering use of third-party libraries, the method comprising the steps of:
    decomposing a program within a third-party library at boundaries of modules of the program into the program's dependencies;
    applying transformations to the decomposed program to insert analysis specific code including a base transform wrap that traverses and augments values with runtime analysis monitors; and
    reassembling individual components of the decomposed program to maintain original semantics of the program while incorporating the transformations that were applied to the decomposed program.

8. The method of claim 7, wherein the step of decomposing a program within the third-party library, further comprises the steps of:
    loading an analysis file;
    determining library boundaries of interest and granularity of analysis; and
    processing the analysis file to extract a mapping from library identifiers to analysis hooks.

9. The method of claim 7, wherein the step of decomposing a program within the third-party library, further comprises the step of checking for constructs not associated with libraries.

10. The method of claim 7, wherein the step of decomposing a program within the third-party library, further comprises the step of dynamically replacing implementation of import to reference the module recontextualization application.

11. The method of claim 7, wherein the step of decomposing a program within the third-party library, further comprises the steps of:
    retrieving an object of interest from the third-party library;
    determine if the object is wrapped in a proxy; and
    wrap the object of interest in a proxy.

12. The method of claim 7, wherein the step of applying transformations to the decomposed program to insert analysis specific code, further comprises the steps of:
    determining if a hook function exists;
    retrieving hook functions; and
    loading hook functions.

13. The method of claim 7, wherein the step of applying transformations to the decomposed program to insert analysis specific code, further comprises the steps of:
    determining whether a primitive belongs to a specific language of the program;
    wrapping the primitive in a proxy; and
    adding the primitive to an object of the program.

14. The method of claim 7, further comprising the step of ensuring that cross-references between libraries resolve correctly.

15. The method of claim 7, further comprising the step of wrapping module code with a code prologue.

* * * * *